United States Patent [19]

Aggarwal et al.

[11] Patent Number: 6,012,126

[45] Date of Patent: Jan. 4, 2000

[54] SYSTEM AND METHOD FOR CACHING OBJECTS OF NON-UNIFORM SIZE USING MULTIPLE LRU STACKS PARTITIONS INTO A RANGE OF SIZES

[75] Inventors: Charu Chandra Aggarwal, Ossining, N.Y.; Marina Aleksandrovna Epelman, Cambridge, Mass.; Joel Leonard Wolf, Katonah; Philip Shi-lung Yu, Chappaqua, both of N.Y.

[73] Assignee: International Business Machines Corporation, Armonk, N.Y.

[21] Appl. No.: 08/741,412

[22] Filed: Oct. 29, 1996

[51] Int. Cl.[7] ..................................... G06F 12/00
[52] U.S. Cl. ..................... 711/133; 711/134; 711/136; 711/129; 711/132; 709/203
[58] Field of Search .................................. 711/113, 118, 711/132, 133, 119, 122, 129, 135, 136, 134, 159, 160; 709/203

[56] References Cited

U.S. PATENT DOCUMENTS

| | | | |
|---|---|---|---|
| 4,503,501 | 3/1985 | Coulson et al. | 711/129 |
| 5,606,688 | 2/1997 | McNutt et al. | 711/170 |
| 5,809,250 | 9/1998 | Kisor | 395/200.57 |
| 5,842,216 | 11/1998 | Anderson et al. | 395/200.33 |

OTHER PUBLICATIONS

Marc Adams, Charles Stanbridge, Ghaleb Abdulla, Stephen Williams, and Edward Fox, "Caching Proxies: Limitations and Potentials", Oct. 1995.

Hypertext Transfer Protocol—HTTP/1.1, J. Mogul DEC H. Frystyk T. Berners–Lee MIT/LCS Jan. 1997, http://www.p-mg.les.mit.edu, J. Gettys.

Timos K. Sellist, "Intelligent Caching And Indexing Techniques For Relational Database Systems", Inform. Systems, vol. 13, No. 2, pp. 175–185, 1988.

Web Server Technology, The Advanced Guide for World Wide Web Information Providers, N. Yeager, et al., pp. 200–201.

Abrams M. Standridge et al., "Caching Proxies: Limitations and Potentials", Fourth International World Wide Web Conference Proceedings, p. 119, (1995).

Abrams M. Standridge et al., "Caching Proxies: Limitations and Potentials", Fourth International World Wide Web Conference Proceedings, pp. 120–133, (1995).

*Primary Examiner*—Eddie P. Chan
*Assistant Examiner*—Kimberly N. McLean
*Attorney, Agent, or Firm*—Kevin M. Jordan

[57] ABSTRACT

A system and method for caching objects of non-uniform size. A caching logic includes a selection logic and an admission control logic. The admission control logic determines whether an object not currently in the cache is accessed may be cached at all. The admission control logic uses an auxiliary LRU stack which contains the identities and time stamps of the objects which have been recently accessed. Thus, the memory required is relatively small. The auxiliary cache serves as a dynamic popularity list and an object may be admitted to the cache if and only if it appears on the popularity list. The selection logic selects one or more of the objects in the cache which have to be purged when a new object enters the cache. The order of removal of the objects is prioritized based both on the size as well as the frequency of access of the object and may be adjusted by a time to obsolescence factor (TTO). To reduce the time required to compare the space-time product of each object in the cache, the objects may be classified in ranges having geometrically increasing intervals. Specifically, multiple LRU stacks are maintained independently wherein each LRU stack contains only objects in a predetermined range of sizes. In order to choose candidates for replacement, only the least recently used objects in each group need be considered.

37 Claims, 7 Drawing Sheets

SYSTEM AND METHOD FOR CACHING OBJECTS OF NON-UNIFORM SIZE USING MULTIPLE LRU STACKS PARTITIONS INTO A RANGE OF SIZES

FIELD OF THE INVENTION

The present invention relates to the caching of objects of non-uniform size. A particular aspect of the present invention is applicable to the caching of objects on the World Wide Web.

Glossary of Terms

While dictionary meanings are also implied by certain terms used herein, the following glossary of some terms may be useful.

Internet

The network of networks and gateways that use the TCP/IP suite of protocols.

Client a computer which issues commands to the server which performs the task associated with the command.

Server

Any computer that performs a task at the command of another computer is a server. A Web server typically supports one or more clients.

World Wide Web (WWW or Web)

The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.

Universal Resource Locator (URL)

A way to uniquely identify or address information on the Internet. Can be considered to be a Web document version of an e-mail address. They can be accessed with a hyperlink. An example of a URL is "http://www.philyu.com:80/table.html". A URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.

HyperText Markup Language (HTML)

HTML is the language used by Web servers to create and connect documents that are viewed by Web clients. HTML uses hypertext documents.

Hypertext Transfer Protocol (http)

http is an example of a stateless protocol, which means that every request from a client to a server is treated independently. The server has no record of previous connections. At the beginning of a URL, "http:" indicates the file contains hyperlinks.

Internet Browser or Web browser

A graphical interface tool that runs Internet protocols such as http, and displays results on the user's screen. The browser can act as an Internet tour guide, complete with pictorial desktops, directories and search tools used when a user "surfs" the Internet. In the present invention the Web browser is a client service which communicates with the World Wide Web.

Client Caches a cache which is built into web browsers, and may either store only the document accesses during the current invocation (nonpersistent cache such as Mosaic) or may cache documents across invocations.

Caching Proxies

Specialized servers in the network which act as agents on the behalf of the client in order to locate the cached copy of a document, if possible. Usually caching proxies serve as secondary or higher level caches, because they are concerned only with cache misses not available on client caches.

Http Daemon (httpd)

A server having Hypertext Markup Language and Common Gateway Interface capability. The HTTPD is typically supported by an access agent which provides the hardware connections to machines on the intranet and access to the Internet, such as TCP/IP couplings.

BACKGROUND

The recent increase in popularity of the World Wide Web (WWW or web) has lead to a considerable increase in the amount of traffic over the Internet. As a result, the web has now become one of the primary bottlenecks on network performance. When documents are requested by a user who is connected to a server via a slow network link, there can be noticeable latency at the user end. Further, transferring the document over the network leads to an increase in the level of traffic over the network. This reduces the bandwidth available for other requests. In order to reduce access latencies, it is desirable to store (cache) copies of popular documents closer to the user, from which the access latencies are more acceptable.

The cache can be implemented at various points on the network. For example, a large university or corporation may have its own local cache, from which all the users subscribing to that network may fetch documents. It is often desirable to implement specialized servers in the network, called caching proxies, which act as agents on the behalf of the client in order to locate the cached copy of a document. Usually caching proxies serve as secondary or higher level caches, because they are concerned only with misses not available on client caches. Client caches are built into the web browsers, and may either store only the document accesses during the current invocation (nonpersistent cache such as Mosaic) or may cache documents across invocations.

One prior art caching method is called the least recently used (LRU) method. In LRU, a list of the objects is maintained in the cache and is ordered based on decreasing frequency of access. In other words the most recently accessed object is the first in the list, while the least recently accessed object is at the bottom. When a new object is accessed, one or more objects may have to be pruned from the list to make room in the cache for the most recently accessed object. Thus, this method does not take size into account in its cache replacement process.

Another important issue is admission control; i.e., when to allow an object to enter the cache at all. It may not always be favorable to insert an object into the cache, because it may lower the probability of a hit to the cache. For two objects which are equally frequently accessed, the cache hit ratio is maximized when the replacement policy is biased towards documents of smaller size. This is because it is possible to store a greater number of smaller size documents. While deciding which documents to replace when a new object enters, both the relative frequency of access, and the size of the objects should be taken into account.

In Abrams M., Standridge C. R., Abdulla G., Williams S., and Fox E. A., "Caching Proxies: Limitations and Potentials. Fourth International World Wide Web Conference Proceedings", Abrams et al., [ABRAMS] discuss some cache replacement policies which do take size into account in the decision making process. The following are two of the policies discussed:

(1) LRU (LRU-THOLD) thresholding policy: In this case, a threshold size is specified, above which no object may be cached. For the purpose of replacement, a pure LRU policy may be used. Thus, this scheme uses size for the purpose of admission control only; while the replacement policy still follows pure LRU replacement; i.e., when an object is to be admitted to the cache, the objects in the list which were the least recently accessed are pruned to make room for the incoming object.

(2) LRU-MIN policy: This policy tries to minimize the number of documents replaced. Let the size of the incoming object be S. If there are any objects in the cache which have a size which is at least S, then remove that object from the cache based on LRU order. On the other hand, if there are no objects with size at least S, then consider objects of size at least S/2, and so on until enough free cache space has been created.

ABRAMS concludes that the LRU-MIN is preferable over most workloads, since (unlike LRU-THOLD) there are no parameters to be chosen. It achieves generally better performance, even when optimal thresholds are used for the LRU-THOLD policy. In fact, the optimal value of the thresholds to be used for the LRU-THOLD policy depend upon the nature and type of the underlying data, which may vary from one application to another.

SUMMARY

The present invention is directed to an improved computer system and method for caching objects of non-uniform size. The caching logic may be organized as two logical components, although it is clearly not so limited.

(1) The selection logic: When a new object enters the cache, one or more of the objects which are in the cache may have to be purged. Consequently, the object(s) to be purged must be selected.

The order of removal of the objects is preferably prioritized based on object size, frequency of object access, and a time to obsolescence (TTO) of the object. According to one aspect of the present invention, the selection logic is such that the removal of the objects has a priority value which is a product of both the object size and the time since last requested (space-time product) (the time since last requested can be considered to be an inverse of the frequency of access). The frequency of access may be adjusted by the TTO, which recognizes that the benefits of caching decreases as the object approaches obsolescence.

According to another aspect of the selection logic, the objects may be classified in ranges having geometrically increasing intervals. Specifically, multiple LRU stacks can be independently maintained wherein each LRU stack contains only objects in a predetermined range of sizes. Thus, only the least recently used object in each stack need be considered by the selection logic, thereby eliminating the need to compare the space-time product of each object in the cache.

(2) Admission Control logic: When an object not currently in the cache is accessed, it may or may not be cached at all. The decision whether or not to cache the object is called the admission control logic. The admission control logic preferably uses a popularity criterion for the objects accessed. The popularity criterion may be implemented through an auxiliary stack which contains the identities or URLs (universal resource locators) and time stamps of the objects which have been recently accessed. The auxiliary stack is preferably maintained in least recently used (LRU) order, and since it contains the identities of objects rather than the objects themselves, the memory required is relatively small. The auxiliary stack serves as a dynamic popularity list and an object may be admitted to the cache if and only if it appears on the popularity list and satisfies certain other requirements which we shall discuss in the detailed description.

BRIEF DESCRIPTION OF THE DRAWINGS

For further features and advantages of the present invention, refer to the detailed description and accompanying drawings, wherein.

DETAILED DESCRIPTION

Figure 1A:
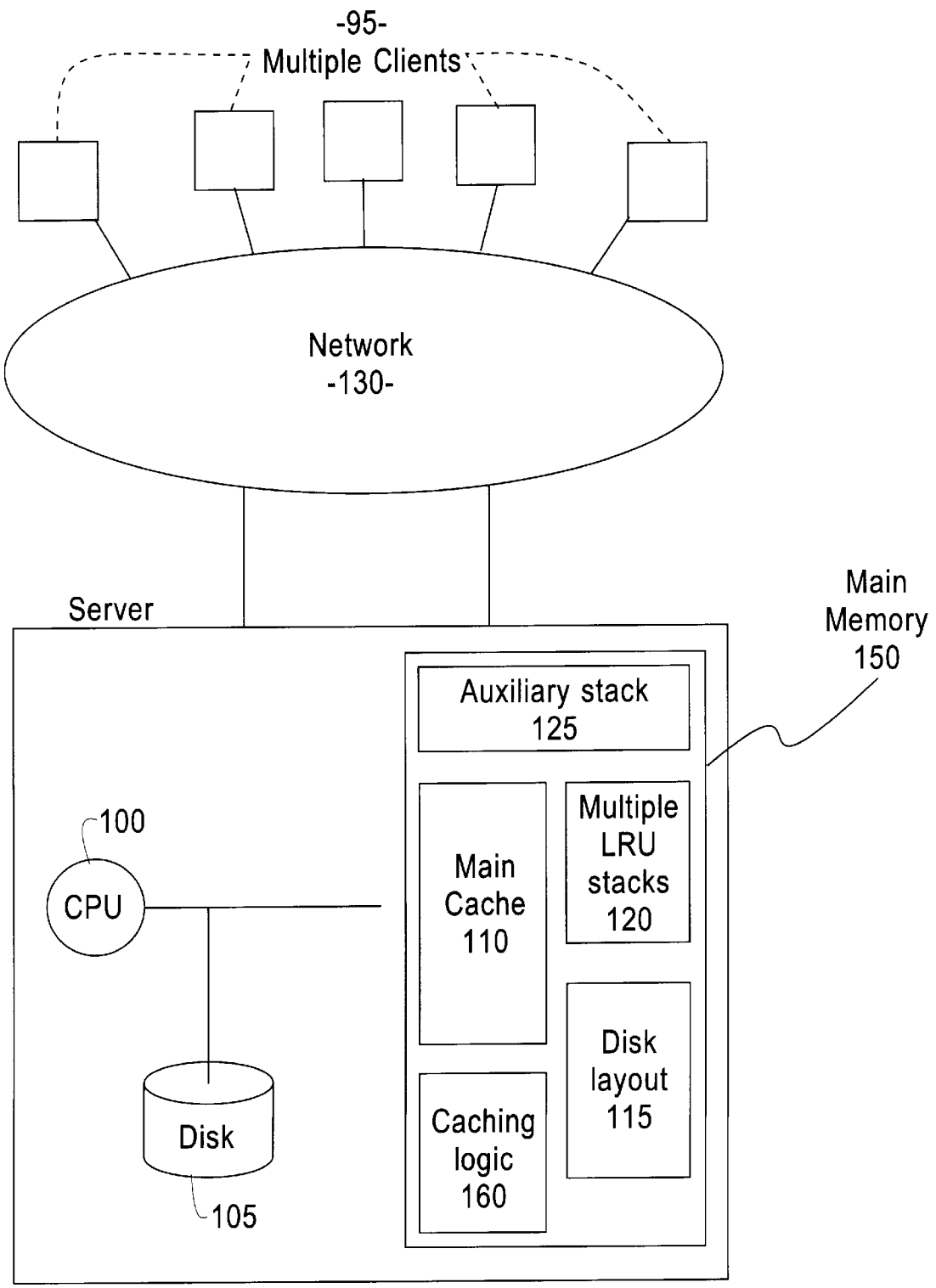
FIG. 1A illustrates a system having features of the present invention.

FIG. 1A depicts a computer system and network having features of the present invention. Those skilled in the art will appreciate that this architecture could support both disk caching via disk 105 as well as caching via main memory 150. Furthermore, although the present invention will be described in terms of a server cache, the caching logic can also (or alternatively) be implemented on the client 95 and/or a proxy server. In the case of network 130 comprising the web, a client 95 is running a conventional web browser including a cache. As is conventional, the browser can communicate an http request for an object (such as a document, graphic, or program) by following hyperlinks or explicitly invoking a URL. Assume, by way of example only, that a requested document is not contained in the client cache. The request is then hyperlinked to the appropriate httpd server.

According to the present invention, a caching logic 160 uses cache meta-information contained in LRU stacks 120 to determine if the document is in the main cache 110. An example of the caching logic will be described with reference to FIGS. 2–6. An example of the LRU stacks 120 and their maintenance will be described with reference to FIG. 1B and FIG. 5, respectively. If disk caching is employed, meta-information available on a disk layout data structure 115 is similarly used to determine if the document is cached on disk 105. If found in the main cache 110 or cached on disk 105, the document is served therefrom to the requesting client 95. The auxiliary stack 125 is also updated, using LRU rules, with the identity and time stamp of the requested object.

If the document is not in the cache then a method is needed for cache admission control (FIG. 4) and, if insufficient cache space exists, selection and replacement of cached objects (FIGS. 2–3, and 5–6). The main memory 150 contains several data structures which are relevant to the caching logic 160 in accordance with the present invention. The multiple LRU stacks 120 in the main memory 150 are used to implement the replacement logic policy. The LRU stacks 120 are illustrated in more detail in FIG. 1B.

By way of overview, when a new object enters the cache, the selection logic (FIGS. 2–3, and 5–6) determines which of one or more of the objects in the cache should be purged. Preferably, the order of removal of the objects is prioritized based on the product of the object size and a time elapsed since last access. The time elapsed since the last access may be adjusted by a factor which accounts for time to obsolescence (TTO). The TTO factor recognizes that each object can become obsolete and thus the benefit of caching decreases with the TTO.

Figure 1B:
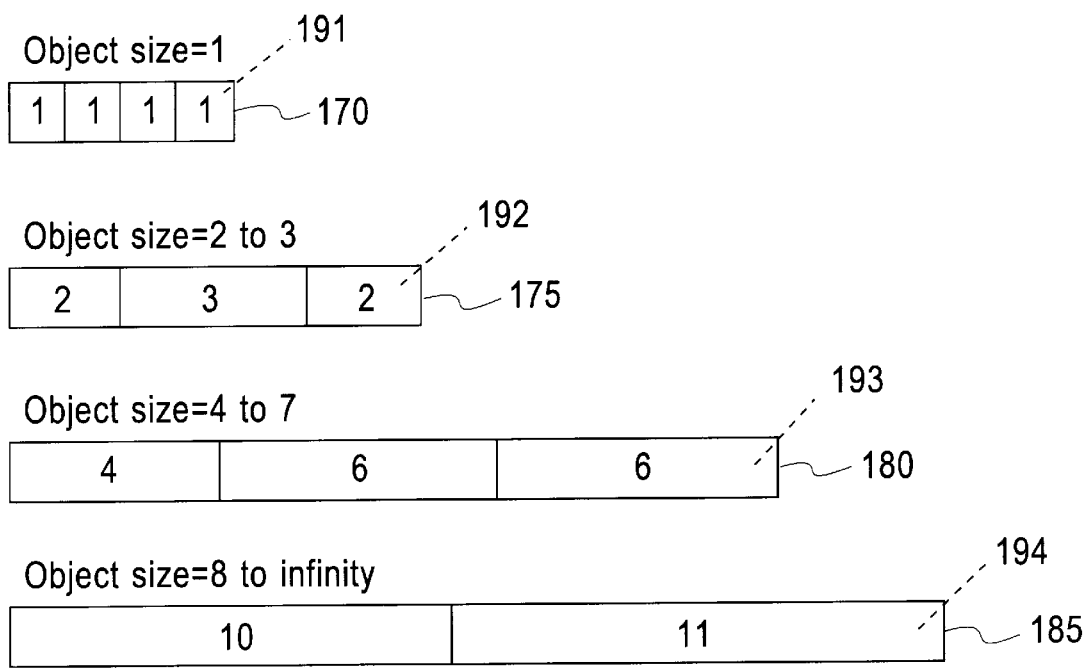
FIG. 1B depicts an example of multiple range-based LRU stacks in accordance with the present invention.

As depicted in FIG. 1B, the LRU stack 120 may be classified in ranges having geometrically increasing size intervals. Thus, only the least recently used objects 191–194 in each range need be considered when choosing candidates for replacement. Thus, the multiple LRU stacks 170–185 can advantageously reduce the number of space-time product comparisons of cached objects.

Returning again to FIG. 1A, the caching logic 160 preferably also includes admission control logic (to be described with reference to FIG. 4) which makes the ultimate decision whether to admit an object to the cache. The admission control logic of the present invention preferably uses a popularity factor for the objects accessed. The popularity factor is implemented by the auxiliary stack 125 which contains the identities or URLs and time stamps of objects which have been recently accessed. The auxiliary stack 125 is preferably maintained in LRU order, and contains the identities of objects (and not the objects themselves), thus reducing memory requirements.

Figure 2:
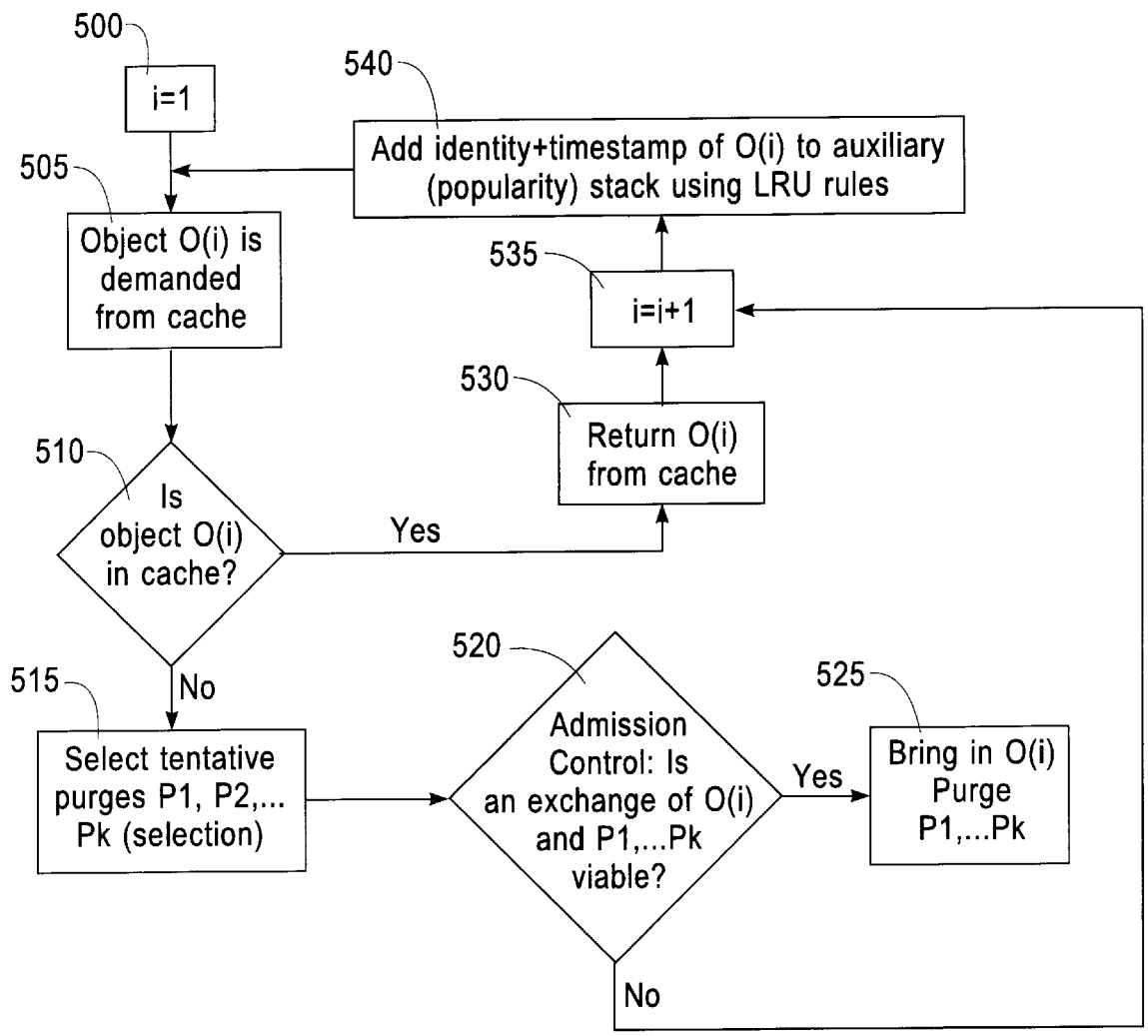
FIG. 2 depicts an example of a flowchart for the caching logic of FIG. 1A.

FIG. 2 depicts an example of the caching logic 160 in accordance with the present invention. A discrete counter i may be used as a surrogate for a time stamp. Those skilled in the art will also appreciate that a system clock would also suffice. In step 500, when the cache 110 is empty, the counter i is initialized to one. For each iteration of the loop formed by steps 500–540, the counter is incremented by one, in step 535. Thus, in step 505, an object demanded in iteration i is O(i). In step 510, it is determined whether or not O(i) is in the cache. In step 530, if O(i) is in the cache, it is retrieved from the cache and returned to the client 95. If O(i) is not in the cache, then it is possible that a cache replacement will take place. In step 515, one or more objects P1 . . . Pk are tentatively selected for purging from the cache. Examples of the selection logic of step 515 will be described in more detail with the reference to FIGS. 3, 5, and 6. Returning to FIG. 2, in step 520 the admission control logic checks whether an exchange of the object O(i) for the tentative purges P1 . . . Pk is indeed favorable. An example of the admission control logic will be discussed with reference to FIG. 4. Returning to FIG. 2, in step 525, if the admission control logic indicates that it is indeed favorable to implement the replacement, then the caching logic stores the object O(i) in the cache and purges P1 . . . Pk. In step 535, the discrete timestamp counter i is incremented by one. In step 540, the auxiliary stack 125 is updated with the identifies and the time stamp of O(i). The stack 125 is preferably maintained using LRU rules.

Figure 3:
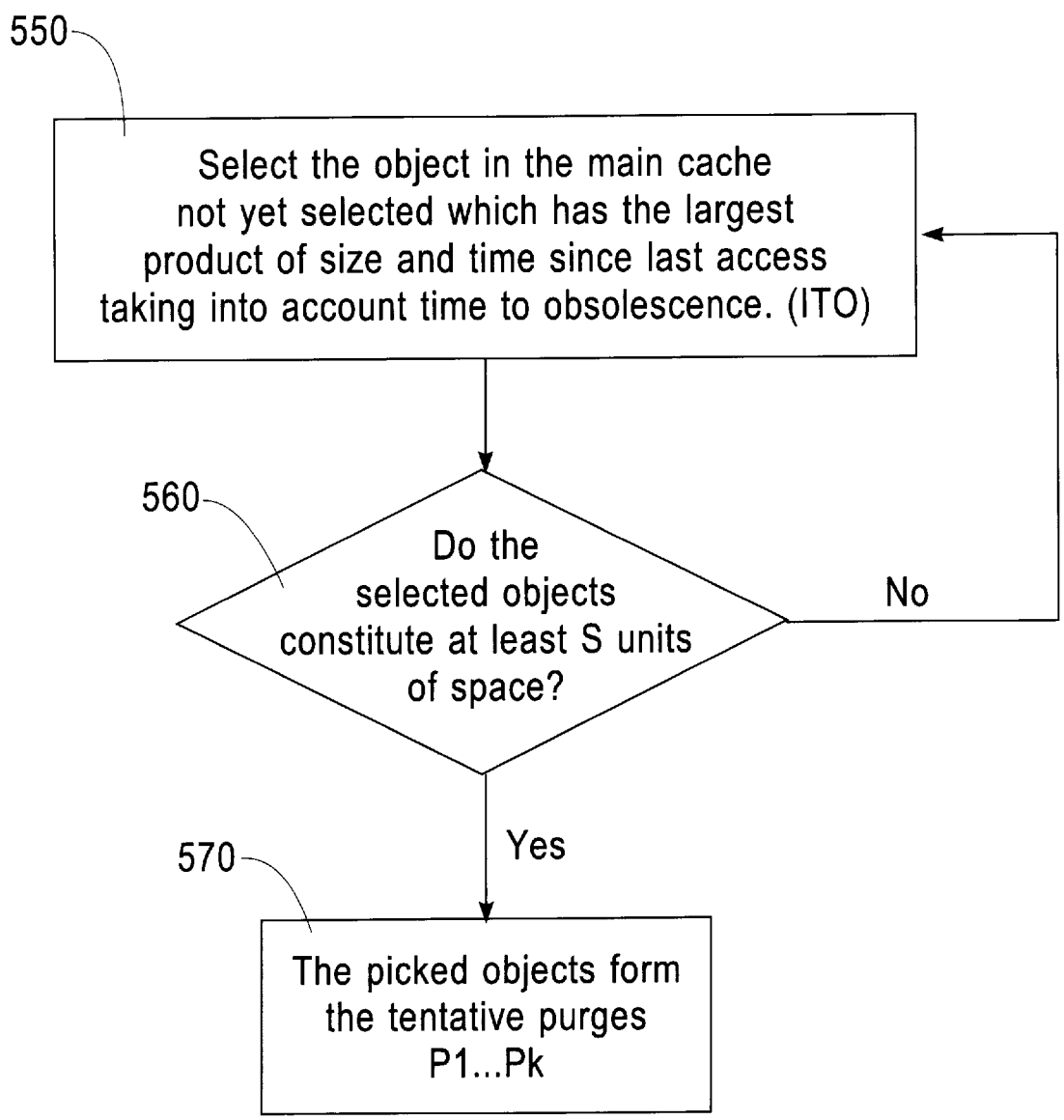
FIG. 3 depicts an example of a flowchart for the selection logic of step 515 in FIG. 2.

FIG. 3 depicts an example of a flowchart for the selection logic of step 515 in FIG. 2. As depicted, in step 550, an object in the cache is selected that has the largest product of size and the time elapsed since the last access. The time since last access may be adjusted by a factor according to time to obsolescence (TTO). The TTO adjustment recognizes that the potential benefit of caching decreases with the TTO. In some cases, the web page specifies the expected time to obsolescence. Generally, the time of last modification of a web page is included in its header. The time since last modified can be use as an indication of the time between modifications of a web page. A fraction of this time interval may be used to estimate the TTO. For a given TTO, the effectiveness of caching is reduced by a factor of (1−1/beta) where beta is a ceiling function of the term TTO divided by the time since last accessed. In step 560, it is determined whether the current set of selected objects occupies at least S units of memory space. If not, the process returns to step 550 to select the next object. Otherwise, the current set of selected objects form the tentative purges P1 . . . Pk.

Figure 4:
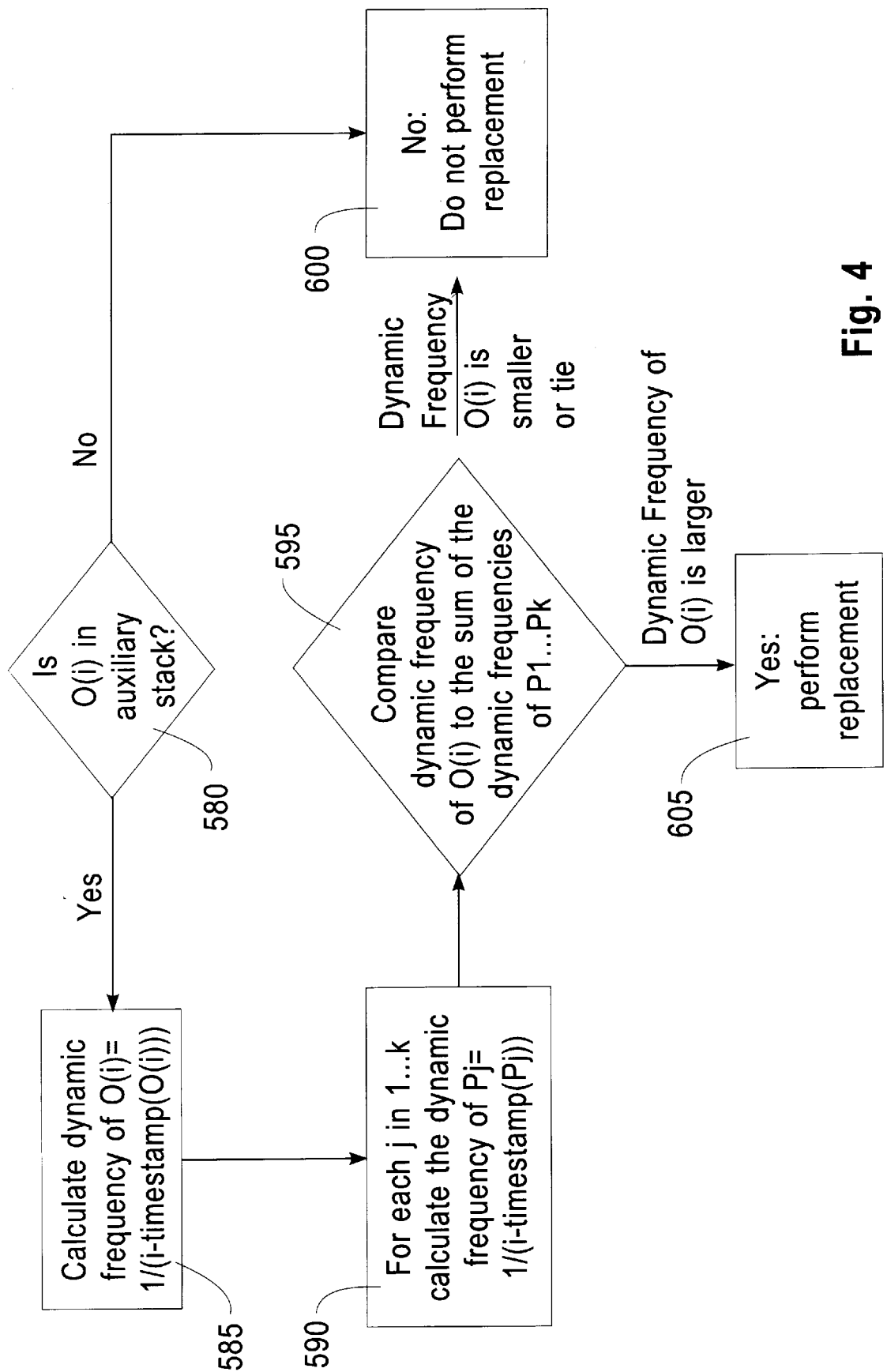
FIG. 4 depicts an example of an admission control flowchart in accordance with the present invention and is a more detailed description of step 520 of FIG. 2.

FIG. 4 depicts an example of an admission control logic in accordance with the present invention and is a more detailed description of step 520 of FIG. 2. An object of the admission control logic is to limit entry to the cache to objects which meet a popularity criterion. The admission control policy logic takes as its input the time stamps of the object O(i) and the tentative purges P1 . . . Pk which were selected by the selection logic. As discussed, the selection logic employs the auxiliary stack 125, which contains only time stamps and URLs (identities) of the objects rather than the actual objects themselves. It is assumed that an initial check has determined that the object O(i) is in the stack 125. If not, then the object O(i) is not popular enough, and there is no point in performing the replacement. As depicted, in step 580, if the object O(i) is in the stack 125, then the dynamic frequencies of O(i) and P1 . . . Pk is calculated in steps 585 and 590, respectively. In step 595, the dynamic frequency of O(i) is compared to the sum of the dynamic frequencies of P1 . . . Pk. In step 605, if the dynamic frequency of O(i) is larger, then the replacement is performed. Otherwise, in step 600, the replacement is not performed. Those skilled in the art will appreciate that one could also factor the TTO into the dynamic frequency calculation.

Figure 5:
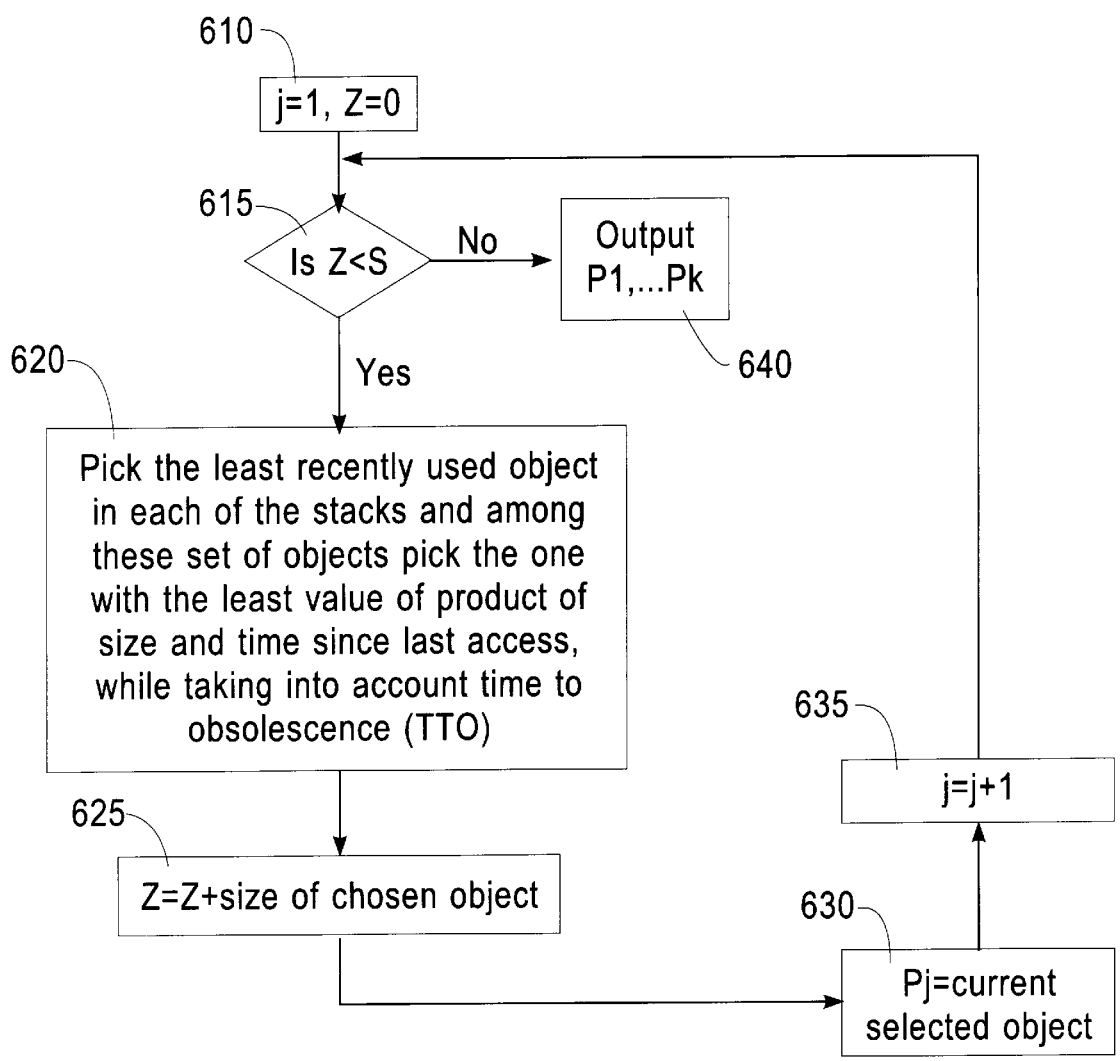
FIG. 5 depicts a flowchart of another version of the selection logic, using multiple LRU stacks.

FIG. 5 depicts a flowchart of another version of the selection logic, using multiple LRU stacks 170–175 for main memory caching of web documents. Recall that multiple LRU stacks are maintained, each of which includes a range of sizes which are a geometric multiple of one another. Note that although FIG. 1B uses four stacks with a multiple of 2, in general, it could be any number of stacks and any constant, A. In step 610, set the counter j to 1 and the currently created space Z to 0. In step 615, check whether the space occupied by the set of chosen objects (none so far) is at least equal to the required space S. If not, in step 620, the least recently used object is selected from each of the stacks 170–185 and the object with the largest value of the product of the size and the time elapsed since last requested is further selected. The use of multiple LRU stacks may thus exhibit improved performance due to the reduction in number of space-time computations and comparisons (as compared to a single LRU stack). As discussed hereinbefore, the time since last access may be adjusted by the TTO. In step 625, the size of the selected object is added to the value Z which is used to track the amount of freed space. In step 630, the object Pj is set to the current object, and in step 635, the counter j is incremented by 1. Next, the process returns to step 615 wherein the space Z is compared to S. If Z is greater than or equal to S, in step 640, the process ends with the set of chosen objects P1 ... Pk being output. This version of the selection logic is particularly advantageous for caching main memory 150 objects. However, when objects are cached on disk 105 the fact that a set of objects which are purged from the cache need to be immediately adjacent should be accounted for.

Figure 6:
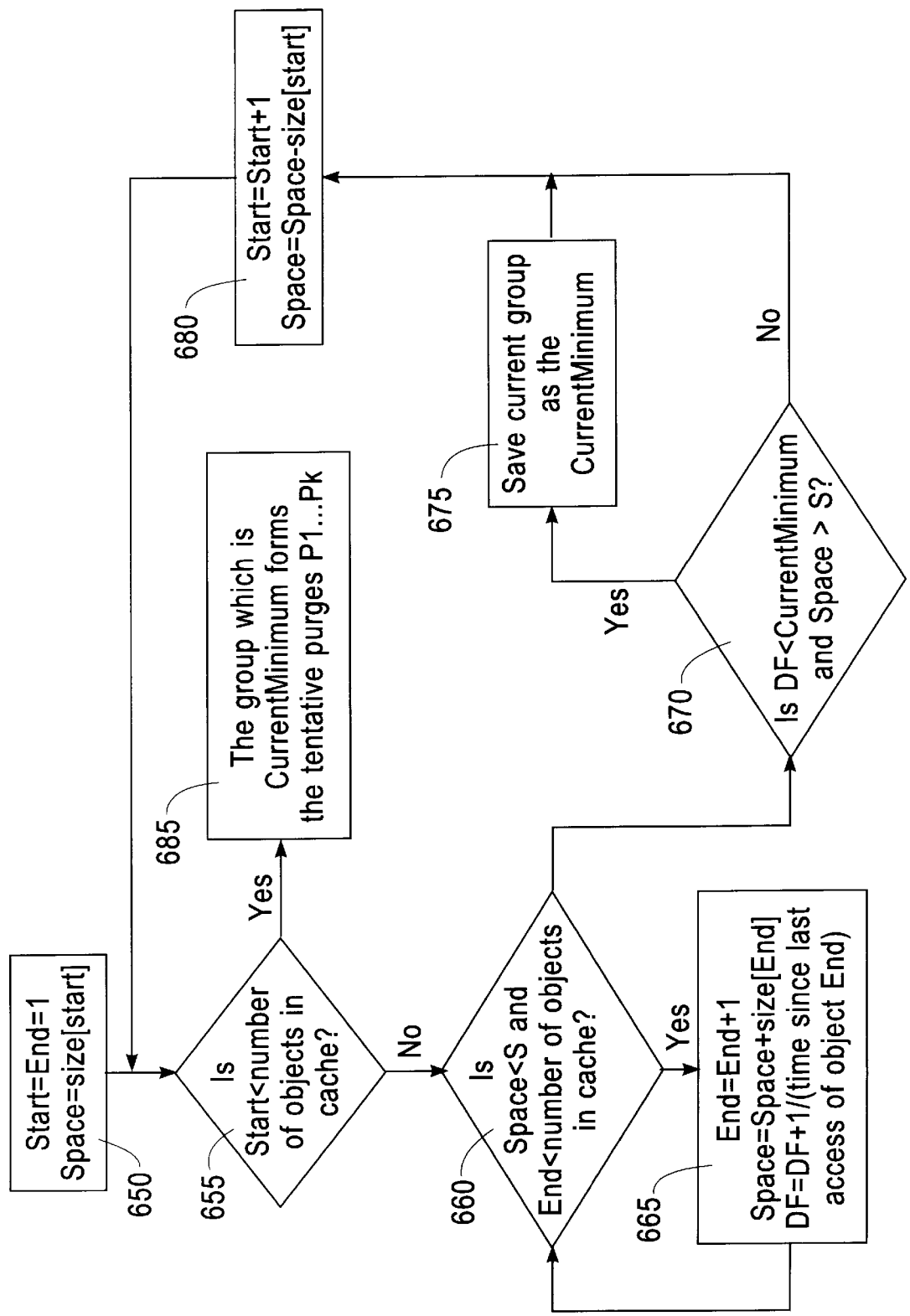
FIG. 6 depicts a flowchart of another version of the selection logic, for disk caching.

FIG. 6 depicts a flowchart of another version of the selection logic, for disk caching. As depicted, to ensure that only physically adjacent objects are purged, two pointers are maintained, Start and End. All the objects lying between these two pointers are candidates for purging, and the size of the objects which physically lie between the pointers Start and End is at least S. The dynamic frequency (DF) of a set of adjacent objects is the sum of the reciprocals of the time since last accesses of those objects, $DF=(1/T_1+1/T_2+1/T_n)$. In step 650, the pointers are initialized, Start=End=1. At this point, the total amount of Space occupied by the objects lying between Start and End is size[1]. In step 655, a check is made whether the pointer Start has already scanned through each object in the cache. If not, then check whether the space between Start and End is sufficient to accommodate the incoming object, in step 660. If the space is not sufficient, then in step 665, increment the pointer End until the group of objects between the pointers Start and End represent enough space to accommodate the incoming object; the dynamic frequency of the object associated with the pointer End is also added to the set of current eligible objects. Once we have obtained the set of adjacent objects, in step 670, it is checked whether the dynamic frequency of this set is less than the current minimum. If so, in step 675, this group is saved as the current minimum. Then, in step 680, the pointer Start is incremented by 1, and the Space is set to Space-size[start]. Next, the process repeats at step 655 in order to find the next eligible adjacent group for purging. Finally, note that when a block gets referenced, a check is made whether it is stale. If it indeed is stale then the time to obsolescence (TTO) is recalculated and then the admission control logic is reapplied to determine whether to continue to cache the block after a refresh.

Now that the invention has been embodied by way of a detailed description, with alternatives, various modifications and improvements will occur to those skilled in the art. Thus, it should be understood that the detailed description is provided as an example and not as a limitation. The proper scope of the invention is defined by the appended claims. For example, the preferred embodiment has been described as a general cache replacement policy for web servers. Those skilled in the art will appreciate, however, that the present invention is applicable to any kind of situation where the objects to be cached are of non-uniform size, and is not necessarily restricted to a web application.

We claim:

1. A method for caching objects of non-uniform size, comprising the steps of:
   receiving an object over a network;
   determining whether to admit a network object to a cache based on one or more objects to be replaced in the cache; and
   when the network object is determined to be cacheable, replacing the one or more objects in the cache with the network object as a function of a cached object size, a time since last requested, and a time to obsolescence (TTO).

2. The method of claim 1, further comprising the step of:
   maintaining multiple LRU stacks, each stack corresponding to a range of object sizes, where a newly cached object is added to an associated stack range.

3. The method of claim 2, further comprising the step of partitioning stack ranges into a predetermined number of ranges according to a geometric progression.

4. The method of claim 1, further comprising the step of:
   for each object request, storing object information in an auxiliary stack; wherein said step of determining whether to admit a requested object to a cache is based on the object information.

5. The method of claim 4, wherein the object information includes an object identifier, and an object request time.

6. The method of claim 2, further comprising the step of examining the least recently requested object in each LRU stack to determine the replacement candidate.

7. The method in claim 1, further comprising the step of selecting an object replacement candidate with the largest value of the product of the object size and the time since last requested, multiplied by an adjustment factor according to the TTO.

8. The method of claim 7, wherein the adjustment factor is a function of a time since the object was last modified and the time since last requested.

9. The method of claim 1 wherein the cache includes multiple hierarchical caches.

10. The method of claim 9 wherein the hierarchical cache comprises one or more of a main memory cache and a disk cache.

11. The method of claim 10 wherein the cache is a disk cache, and wherein said step of replacing the one or more objects in the cache comprises the step of selecting a set of physically contiguous objects in the disk cache according to a combined function of last request times.

12. The method of claim 11, wherein the combined function comprises the sum of the reciprocals of the time since a last object request in the set of contiguous objects.

13. The method of claim 1, further comprising the step of estimating when the object will be obsolete; and determining whether a refreshed copy of the object is going to continue to be cached.

14. The method of claim 1, wherein said step of determining whether to admit a requested object to a cache is based on the time since last requested, and the TTO.

15. A computerized system for caching objects of non-uniform size, comprising:
   a CPU;
   cache storage means, coupled to the CPU, for storing a plurality of objects;
   caching logic means, coupled to the CPU, for determining whether an object communicated over a network will be stored in the cache, said caching logic means including: (a) admission control means for determining whether to admit a network object to a cache based on one or more objects tentatively selected to be replaced; and (b) selection logic means for selecting one or more objects in the cache to be tentatively replaced as a function of the object size, a time since last requested, and a time to obsolescence (TTO); wherein the selection logic means is coupled to the admission control means; and
   multiple LRU stacks, each stack corresponding to a range of object sizes, wherein the selection logic means is coupled to the LRU stacks which are partitioned into a predetermined number of stack ranges according to a geometric progression; wherein said selection logic means examines the least recently requested object in each stack to determine the object to be replaced.

16. The system of claim 15, further comprising:

an auxiliary stack, coupled to the CPU;

said admission control means including means for storing object information in the auxiliary stack for each object request, the object information including an object identifier, and one or more of a timestamp, and the TTO;

said admission control means comprising means for determining whether to admit the object requested to the cache as a function of the object information; and said admission control means including means for determining when the object is obsolete and whether a refreshed copy of the object will continue to be cached.

17. The system of claim 15, wherein said selection logic means comprises means for selecting an object replacement candidate with a largest value of the product of the object size and the time since last requested multiplied by a percentage of the TTO.

18. The system of claim 15, wherein the TTO comprises a function of the time since the object was last modified and the time since last requested.

19. The system of claim 15 wherein the cache includes multiple hierarchical caches.

20. The system of claim 19 wherein a hierarchical cache comprises of a main memory cache and a disk cache.

21. The system of claim 20 wherein said selection logic means includes means for selecting a set of physically contiguous objects on the disk cache according to a sum of the reciprocals of the time since a last object access for the set of contiguous objects.

22. The method of claim 1, wherein said replacing step further comprises the step of:

replacing an object in the cache with the requested object as a function of the cached object frequency of access wherein the frequency of access is a reciprocal of the time since last requested.

23. The method of claim 22, further comprising the step of adjusting the object frequency by the TTO.

24. The method of claim 1, wherein said replacing step further comprises the step of:

identifying a set of tentative objects P1 . . . Pk to be purged from the cache;

calculating a dynamic frequency of the requested object and the dynamic frequency of said set of objects P1 . . . Pk;

comparing the dynamic frequency of the requested object to a sum of dynamic frequencies of said set of objects P1 . . . Pk; and replacing said set of objects with the requested object if the dynamic frequency of the requested object is larger, in response to said comparing step.

25. A method for caching objects of non-uniform size, comprising the steps of:

receiving an object communicated over a network;

selecting one or more cached objects to be replaced with a network object such that replacement of the one or more cached objects has a priority value which is a space-time product of both a cached object size and the time since last requested, in response to said receiving step; and replacing the one or more cached objects with the network object, in response to said selecting step.

26. The method of claim 25, wherein said priority value is further based on a time to obsolescence (TTO) of a cached object.

27. The method of claim 25, further comprising the step of:

maintaining multiple LRU stacks, each stack corresponding to a range of object sizes, where a newly cached object is added to an associated stack range.

28. The method of claim 27, further comprising the step of partitioning stack ranges into a predetermined number of ranges according to a geometric progression.

29. The method of claim 25, further comprising the step of:

for each object request, storing object information in an auxiliary stack; and determining whether to admit the network object to the cache based on the object information, in response to said selecting step.

30. The method of claim 29, wherein said step of determining whether to admit a requested object to a cache is based on the time since last requested, and a time to obsolescence.

31. The method of claim 29, wherein the object information includes an object identifier, and an object request time.

32. The method of claim 29, further comprising the steps of;

determining that the network object is in the auxiliary stack;

if the network object is in the auxiliary stack, comparing a dynamic frequency of the network object with a sum of dynamic frequencies of the one or more objects selected; and said replacing step further comprising the step of replacing the one or more cached objects with the network object if the dynamic frequency of the network object is larger than the sum of dynamic frequencies of the one or more objects selected.

33. The method of claim 27, further comprising the step of examining the least recently requested object in each LRU stack to determine the replacement candidate.

34. The method in claim 25, further comprising the step of selecting an object replacement candidate with the largest value of the space-time product of the object size and the time since last requested, multiplied by an adjustment factor according to the TTO.

35. The method of claim 34, wherein the adjustment factor is a function of a time since the object was last modified and the time since last requested.

36. A program storage device readable by a machine, tangibly embodying a program of instructions executable by the machine to perform method steps for caching objects of non-uniform size, comprising the steps of:

receiving an object over a network;

determining whether to admit a network object to a cache based on one or more objects to be replaced in the cache; and when the network object is determined to be cacheable, replacing the one or more objects in the cache with the network object as a function of a cached object size, a time since last requested, and a time to obsolescence.

37. A program storage device readable by a machine, tangibly embodying a program of instructions executable by the machine to perform method steps for caching objects of non-uniform size, comprising the steps of:

receiving an object over a network;

selecting one or more cached objects to be replaced with a network object such that replacement of the one or more cached objects has a priority value which is a space-time product of both a cached object size and the time since last requested, in response to said receiving step; and replacing the one or more cached objects with the network object, in response to said selecting step.

* * * * *